United States Patent
Baars

(10) Patent No.: US 9,836,383 B1
(45) Date of Patent: *Dec. 5, 2017

(54) GENERATING STABLE FILE LOCATION IDENTIFIERS FOR REFERENCE TO LOCATIONS IN A FILE

(71) Applicant: SEMMLE LIMITED, Oxford (GB)

(72) Inventor: Arthur Baars, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,014

(22) Filed: Jul. 6, 2017

Related U.S. Application Data

(63) Continuation of application No. 15/201,919, filed on Jul. 5, 2016, now Pat. No. 9,720,806.

(51) Int. Cl.
  *G06F 9/44* (2006.01)
  *G06F 9/45* (2006.01)
  *G06F 11/36* (2006.01)

(52) U.S. Cl.
  CPC .............. *G06F 11/366* (2013.01); *G06F 8/70* (2013.01); *G06F 8/71* (2013.01); *G06F 11/3604* (2013.01)

(58) Field of Classification Search
  CPC ... G06F 8/42; G06F 8/443; G06F 8/70; G06F 8/71; G06F 11/3604; G06F 11/366
  USPC .................................. 717/120–135, 140–143
  See application file for complete search history.

(56) References Cited

U.S. PATENT DOCUMENTS

| | | |
|---|---|---|
| 2005/0193216 A1 | 9/2005 | Gurda et al. |
| 2006/0206875 A1 | 9/2006 | Ullmann et al. |
| 2008/0250398 A1 | 10/2008 | Takahashi et al. |
| 2013/0019231 A1 | 1/2013 | Mangard et al. |

OTHER PUBLICATIONS

Wikipedia, "Content-addressable storage," Wikipedia, the free encyclopedia, last modified on Nov. 27, 2015 [retrieved on Feb. 3, 2016]. Retrieved from the Internet: URL<https://en.wikipedia.org/wiki/Content-addressable_storage>, 4 pages.
Wikipedia, "Static program analysis," Wikipedia, the free encyclopedia, last modified on Jun. 6, 2016 [retrieved on Jul. 5, 2016]. Retrieved from the Internet: URL<https://en.wikipedia.org/wiki/Static_program_analysis>, 5 pages.

*Primary Examiner* — Qing Chen
(74) *Attorney, Agent, or Firm* — Fish & Richardson P.C.

(57) ABSTRACT

Methods, systems, and apparatus, including computer programs encoded on computer storage media, for generating stable location identifiers. One of the methods includes generating, for each relevant location in an existing file, a signature for the relevant location using at most a predetermined quantity of characters surrounding the relevant location; obtaining, for a first file that includes location information for the existing file, data that identify one or more locatable strings in the existing file and, for each locatable string, a corresponding location within the existing file; determining, for each particular location associated with a locatable string from the one or more locatable strings in the existing file, a respective corresponding signature; and generating the first file that includes, for each locatable string from the one or more locatable strings, the respective corresponding signature that uniquely identifies the relevant location on which the locatable string occurs in the existing file.

30 Claims, 3 Drawing Sheets

GENERATING STABLE FILE LOCATION IDENTIFIERS FOR REFERENCE TO LOCATIONS IN A FILE

CROSS-REFERENCE TO RELATED APPLICATION

This application is a continuation of, and claims priority to, U.S. application Ser. No. 15/201,919 (now U.S. Pat. No. 9,720,806), filed on Jul. 5, 2016, the entire contents of which are hereby incorporated by reference.

BACKGROUND

This specification relates to static analysis of source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

A static analysis system can analyze the source code in a snapshot and generate static analysis results. The static analysis results can be stored in static analysis results files. The static analysis results can include characteristic segments of extracted source code identified by the static analysis system. A characteristic segment of source code is a segment of source code having a particular attribute. Static analysis results can include data specifying where, in the project, the characteristic segments of source code occur.

An example of characteristic segments of source code that a static analysis system may generate is source code coding defects. Coding defects are segments of source code that violate one or more coding standards. Data representing such coding defects may be referred to as violations. Thus, a violation can identify a location in a source code file of a coding defect, a type of the coding defect, and the segment of source code that causes the coding defect. For example, a segment of source code that compares variables of incomparable types is a coding defect, which can be represented by a corresponding violation that identifies the location of the source code, the source code itself, and a type of "comparison between variables of incomparable types."

A static analysis system can store source code snapshots and static analysis results files in a version control repository, which can be a content-addressable storage (CAS) system. A CAS system generates file identifiers that are based on the content of the file. Thus, if two static analysis results files are the same, a CAS system will store only one version of the two files. However, if two static analysis results files are different, a CAS system will need to store information representing the difference or both copies in their entirety.

SUMMARY

The specification describes how a system can generate stable location identifiers for static analysis results. In some static analysis systems, a tiny change to a source code file for a snapshot can produce dramatic differences in static analysis results files. For example, adding a blank line to the top of a source code file can change every line number for the violations identified by a corresponding static analysis results file, even though the blank line has no effect on the existence of the violations themselves.

By using stable location identifiers, the static analysis results do not change in any significant way when inconsequential changes are introduced to the source code files. To do so, the system can use location signatures, e.g., as unique contextual identifiers, instead of line numbers, character offsets, or other absolute location identifiers when generating static analysis results. Doing so increases the stability of static analysis results files in the face of inconsequential changes to the source code files.

The subject matter described in this specification can be implemented in particular embodiments and may result in one or more of the following advantages. A system may produce fewer changes between different versions of a file by using location signatures instead of line numbers or other character offsets. Assigning unique contextual identifiers to locations in a first file that is referenced by a second file can reduce storage requirements for a storage repository that includes the second file, e.g., when changes between versions of a source code file as the first file do not create or remove source code violations, when changes between versions are minimal, or both. For instance, a code analysis system uses unique contextual location identifiers to reduce storage requirements, e.g., in a content-addressable storage, when changes between versions of a source code file do not change the types of errors, the quantity of errors, or both, identified in a results file, e.g., as a second file. A system that uses unique contextual location identifiers may have more stable location identifiers across multiple snapshots compared to other systems. For instance, the use of unique contextual location identifiers may make it easier for the system to implement matching violations across many snapshots, e.g., to track a violation from its introduction point in a particular snapshot to the later snapshots where the violation got fixed.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
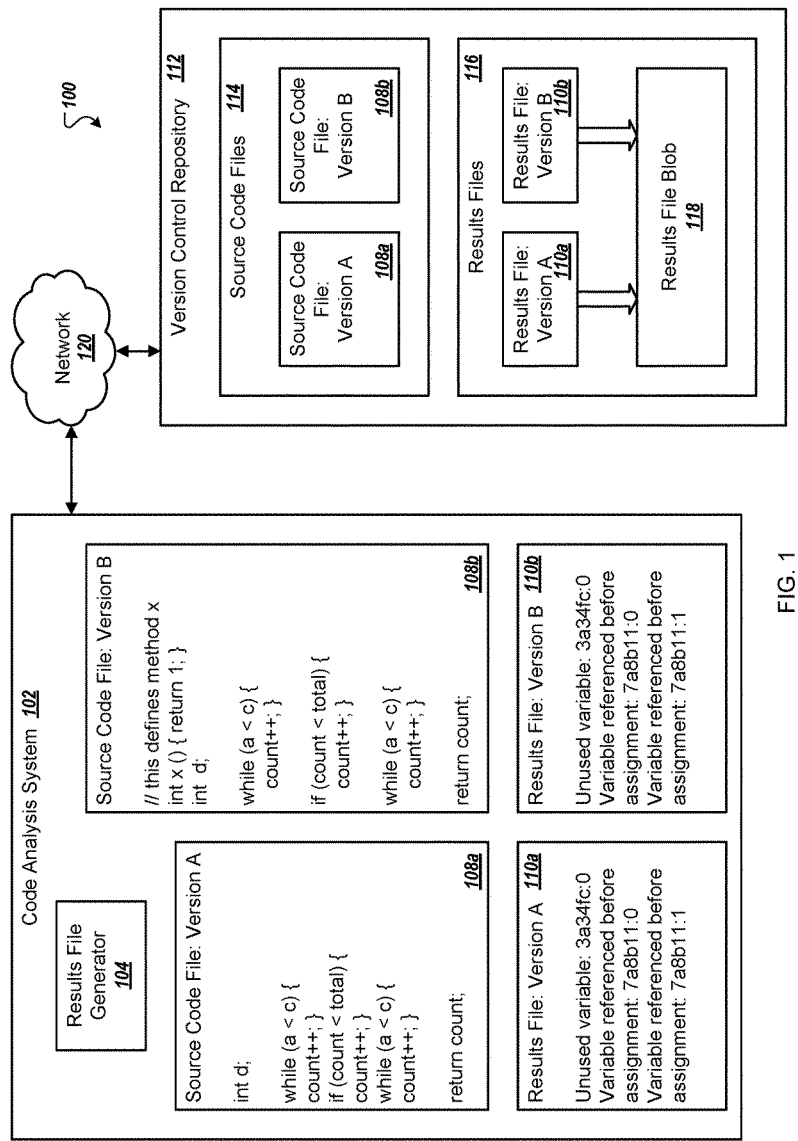
FIG. 1 is a diagram of an example system in which a code analysis system generates results files using source code line signatures.

To generate stable location identifiers, a code analysis system can generate a hash for each relevant location, e.g., segment, of the particular source code file using a particular quantity of characters before, after, or surrounding the location. The code analysis system can guarantee generation of a unique signature for each location by also using a count that represents the number of earlier locations in the particular source code file with the same hash. For example, the first location in a particular source code file having a hash of "7a8b11" can be assigned a signature of "7a8b11:0," the second location in the particular source code file having the hash of "7a8b11" can be assigned a signature of "7a8b11:1," and so forth.

The code analysis system stores in a results file the location signatures for the relevant locations from the particular source code file in which violations occur rather than line numbers, character offset, or any other absolute location in the file. When a storage system includes multiple snapshots of source code and corresponding results file, the use of location signatures reduces the likelihood that results files change between snapshots without substantial edits to the corresponding source code files that change the resulting violations. This reduces an amount of storage required to store the results files, e.g., when each snapshot that has the same results file can point to the exact same data in the data store.

For example, when the code analysis system stores the results files in a content-addressable storage (CAS), the CAS will only store a single copy of the results file when the results file is the same for each of the multiple code snapshots. When the code analysis system generates a large quantity of results files for a particular project or large results files for the particular project, the CAS will only store the single results file once and reference that single results file in each of the multiple snapshots, thus reducing storage requirements for the snapshots.

Some examples of changes to source code files that would not change location signatures in the source code file include the addition of new whitespace, replacement of one type of white space with another, e.g., a space character with a tab character, addition or modification of a comment, and the addition of code that does not introduce or remove a violation, e.g., a violation of a coding standard detected during static analysis of the source code file.

When the code analysis system stores results files in a version control system that uses delta encoding, e.g., a CAS system that uses delta encoding, the storage space required to store data for results files from multiple snapshots may be reduced even further. For example, the code analysis system may receive a source code file in which a line signature, e.g., a location signature that represents the beginning of a particular line, changes from a previous version of the source code file because of new code just before the line, just after the line, or both, or for which there is a new code violation. The code analysis system may store the delta corresponding to the new signature identified in a results file for the new version of the source code file or the delta corresponding to the new violation identified in the results file for the new version of the source code file without storing an entire copy of the new results file. If the code analysis system used line numbers for the results files instead of line signatures, the code analysis system would store more data for the results files in the version control system since any time a line number for a violation changes, there would likely be a larger delta between snapshots and the version control system would need to store more data to represent the larger delta. For instance, when a single line number changes or when a new violation is introduced, e.g., toward the beginning of the source code file, it is likely that multiple line numbers for the source code file will change and the code analysis system would need to store data representing the changes to all of the line numbers thus severely reducing or eliminating the storage advantages of delta encoding.

In some implementations, a system may use location signatures for any appropriate type of file that references another file. For instance, the system may use location signatures for jump to location information, references between multiple documents, e.g., text files or word processor documents, spreadsheets, or any other appropriate type of document. In some examples, the system may use location signatures in a first document instead of paragraph numbers as a reference to a second document.

Any appropriate type of system may perform the methods described in this document. For instance, when a system uses location signatures to analyze a file that is not a source code file, the system might not be a code analysis system. A file analysis system may be used to generate location signatures for files that includes references to other files, such as text documents, Extensible Markup Language (XML) files, spreadsheets, drawing, presentations, or a combination of two or more of these. In some examples, a file analysis system may generate location signatures for source code files.

In some examples, a file analysis system may analyze XML files that represent a book. The file analysis system may generate a word or phrase index for the book using location signatures. The file analysis system may store the phrase index in a repository with a copy of the book. When the book is completed, the file analysis system may generate a finalized index for the book by converting the location signatures to location identifiers, such as page numbers, using the methods described below. The finalized index may be included as part of the book, e.g., at the end of the book.

The file analysis system may use the location signatures to minimize a number of changes that occur to the phrase index in response to edits to the content of the book. For instance, if the file analysis system were to use page numbers or paragraph numbers and an introduction or preface is added to the book, the file analysis system would need to update all of the page numbers or paragraph numbers used in the phrase index. When the file analysis system uses location signatures, the file analysis might not have to change any entries in the phrase index or may likely change fewer entries than if the file analysis system used page numbers or paragraph numbers.

FIG. 1 is a diagram of an example system 100 in which a code analysis system 102 generates results files using source code line signatures. The code analysis system 102 uses the line signatures to reduce storage requirements for storage of a source code project, and corresponding results files, in a version control repository 112, e.g., a content addressable storage.

For instance, the code analysis system 102 includes a results file generator 104 that analyzes source code files A-B 108a-b and generates corresponding results files A-B 110a-b. The results file generator 104 may generate any appropriate type of analysis results files. For example, the results file generator 104 may generate static analysis results files or another type of file that links data in the results file to a particular portion of a source code file using source code line signatures. The results files A-B 110a-b may include static analysis results, metadata about a corresponding snapshot, e.g., jump-to-definition data that comprises software-element-to-location mappings, or both. In some examples, the results file generator 104 may link test, runtime data, e.g., dynamic analysis data, or external data to particular portions, e.g., lines, of a source code file.

In this example, the source code file A 108a includes the source code shown in Table 1 below.

TABLE 1 source code file A 108a int d;
while (a < c) {
count++; }
if (count < total) {
count++; }
while (a < c) {
count++; }
return count;

A later version of the source code file A 108*a*, the source code file B 108*b*, includes the source code shown in Table 2 below. For clarity, the additions are underlined, except for the blank new lines:

TABLE 2 source code file B 108b

// this defines method x
int x ( ) { return 1; }
int d;
while (a < c) {
count++; }
if (count < total) {
count++; }
while (a < c) {
count++; }
return count;

The results files A-B 110*a-b* each indicate portions of the corresponding source code for which a locatable string of source code occurs.

The results file A 110*a* for the source code file A 108*a* includes the static analysis results shown in Table 3 below.

TABLE 3 results file A 110a

Unused variable: 3a34fc:0
Variable referenced before assignment: 7a8b11:0
Variable referenced before assignment: 7a8b11:1

These static analysis results identify the following violations. The first violation identifies that the variable "int d" is not used. The second violation identifies that the variable "a" in the first instance of "while (a<c)" is referenced before being assigned. Similarly, the third violation also identifies that the variable "a" in the second instance of "while (a<c)" is referenced before being assigned.

The results file B 110*b* for the source code file B 108*b*, shown in Table 4 below, includes the same static analysis results as the results file A 110*a*.

TABLE 4 results file B 110b

Unused variable: 3a34fc:0
Variable referenced before assignment: 7a8b11:0
Variable referenced before assignment: 7a8b11:1

For instance, the results file generator 104 creates the results file A 110*a* using the source code file A 108*a* that identifies the line signatures "3a34fc:0," "7a8b11:2," and "29aa2f:0" as described in more detail below. The results file generator 104 creates the results file B 110*b* using the source code file B 108*b* that identifies the same line signatures In other words, even though the actual lines on which the violations occur in the source code file B 108*b* have changed from the lines in the source code file A 108*a*, the results files A-B 110*a-b* are the same.

The code analysis system 102 creates snapshots in the version control repository 112 using the source code file A 108*a* and the source code file B 108*b*. For instance, the code analysis system 102 sends files for a snapshot A that includes the source code file A 108*a* and the results file A 110*a* to the version control repository 112 as part of a request to create the snapshot A. The snapshot A may be a first snapshot for a particular project or may be a later snapshot for the particular project. The code analysis system 102 receives from the version control repository 112 an identifier for the snapshot A in response to the request to create the snapshot A in the version control repository 112.

The code analysis system 102 may provide the source code file B 108*b* and the results file B 110*b* to the version control repository 112 as part of a request to create a subsequent snapshot B. For instance, the results file generator 104 may analyze the source code file B 108*b* and generate the results file B 110*b* using line signatures for the source code file B 108*b* when the code analysis system 102 creates the results files for the snapshot B. The results file generator 104 may determine line signatures for each line of source code in the source code file B 108*b*, as described in more detail below, and uses the line signatures to create the results file B 110*b*. In some examples, the results file generator 104 or another system may have generated the results file B 110*b* prior to the code analysis system 102 sending the version control repository 112 a request to create the snapshot B.

The version control repository 112 generates an identifier for the source code file B 108*b* and an identifier for the results file B 110*b* when storing the files in a data store. In some examples, e.g., when the version control repository 112 includes a content-addressable store, the version control repository 112 may store the contents of the results file B 110*b* in a data store without first determining whether another file in the version control repository 112 has the same identifier. Since the version control repository 112 is a content-addressable storage in this example, the results file blob 118 is stored in a data store of the version control repository 112 only once. In response to the request to create the snapshot B, the code analysis system 102 receives an identifier for the snapshot B from the version control repository 112.

The code analysis system 102 may use the identifier for the snapshot A or the identifier for the snapshot B to retrieve a file from the snapshot. For example, the code analysis system 102 provides the version control repository 112 with the snapshot identifier for the snapshot A and a file path indicating a location at which the results file A 110*a* was stored. In response, the code analysis system 102 receives a copy of the results file A 110*a* for the snapshot A from the version control repository 112.

The version control repository 112 may use the snapshot identifier and the filepath to determine where the results file A is stored in a data store. For instance, the version control repository 112 may use a content-addressable storage. The content-addressable storage may store the results file as a blob in data store and use the identifier to access the blob.

The code analysis system 102 may provide the version control repository 112 with instructions using a network 120. The network 120, such as a local area network (LAN), wide area network (WAN), the Internet, or a combination thereof, connects the code analysis system 102 and the version control repository 112. For instance, the network 120 connects the one or more first computers used to implement the code analysis system 102 with the one or more second computers used to implement the version control repository 112. In some examples, the same computers may implement the code analysis system 102 and the version control repository 112.

The code analysis system 102 is an example of a system implemented as computer programs on one or more computers in one or more locations, in which the systems, components, and techniques described herein are implemented. For instance, the code analysis system 102 may include multiple servers in two or more physical locations. Each of the servers may include a portion of the version control repository 112, e.g., memories that store data for part of the version control repository 112.

Figure 2:
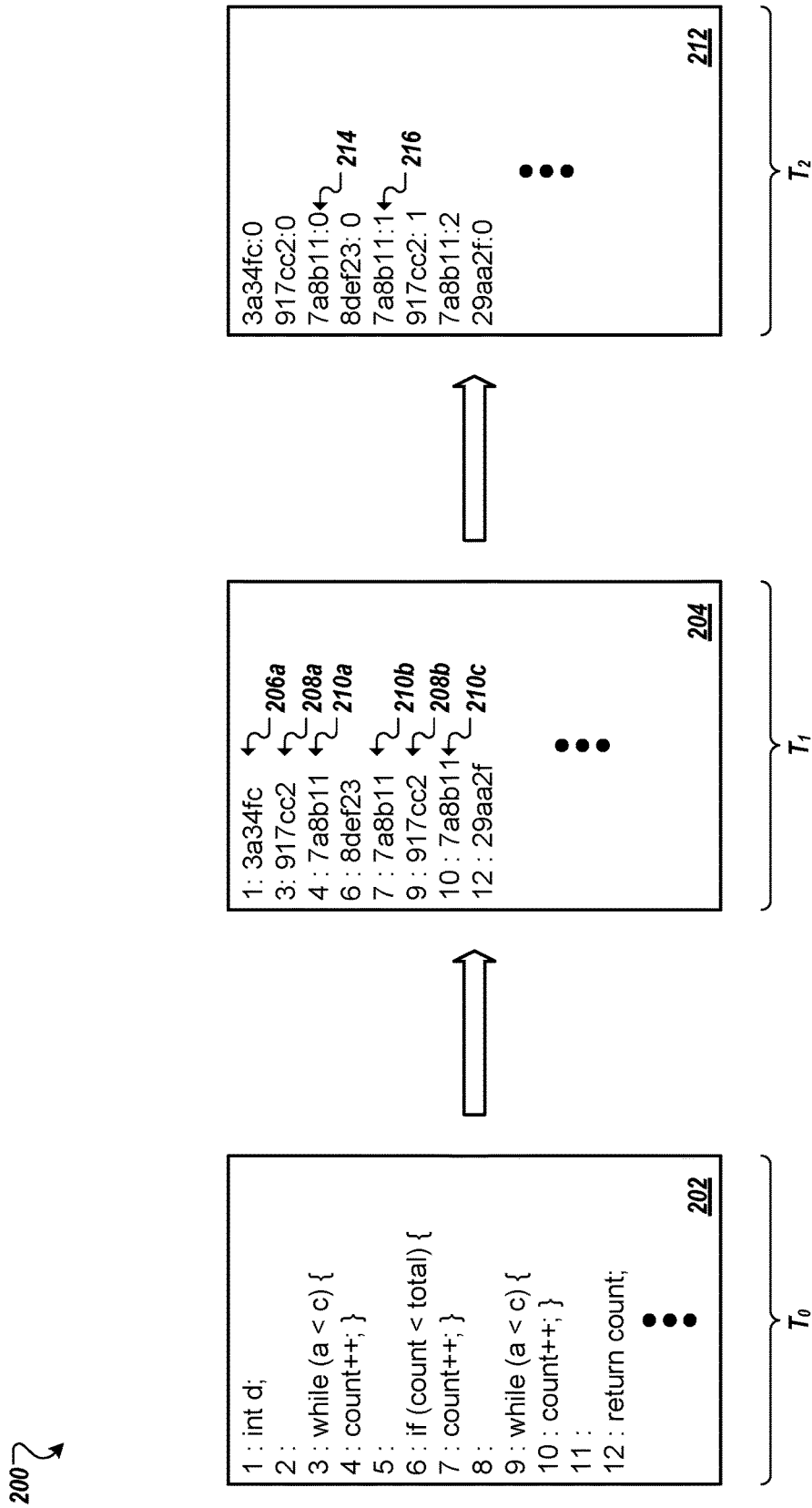
FIG. 2 is an example of an environment in which a system generates source code line signatures.

FIG. 2 is an example of an environment 200 in which a system generates source code line signatures. The system may use the line signatures in results files or other types of files that reference particular locations in a source code file. The system stores the results files and the source code files in version control system for later reference, e.g., as part of a snapshot for a source code project. The process is designed to minimize changes in results files, so the version control system may use a single instance of a file across multiple snapshots when the file does not change, e.g., to reduce an amount of space required for the snapshots in a data store.

When a file in a snapshot has had only a minor change since the previous snapshot, other systems can produce a results file with many differences from a previous version of the results file even though the information that the results file contains is virtually unchanged. To reduce a likelihood that systems create different results files for snapshots when the results files identify the same locatable strings of source code, the system for the environment 200 uses source code line signatures. A system may use other appropriate location signatures such as character-offset signatures. In some examples, line signatures may work well in practice, and may correspond to line numbers as a type of location indicators.

At time $T_0$, the system receives a source code file 202. The system may receive the source code file 202 from a data store, e.g., in a version control repository, or another system. In some examples, the system may be part of a version control repository. In some implementations, the source code file 202 does not include the line numbers shown in FIG. 2.

The system uses a hash algorithm to compute a hash for each line of the source code file 202. For instance, the system may use a rolling hash algorithm with a window of one-hundred characters starting at the beginning of each line to compute the hash for each line of the source code file 202. The system may use a hash that uses at most a predetermined number of characters from a line, or another appropriate hash. The system may use any appropriate window size, whether the window size is static or dynamic, to compute the hash for a line of the source code file. For example, the window size may be chosen to balance hash collisions (common when window size is small) and spurious hash changes (common when the window size is large). When using the rolling hash window of size one-hundred, for example, the system may analyze up to the first one-hundred characters of the first line in the source code file 202 to generate a first hash 206a, then analyze up to the first one-hundred characters of the second line in the source code file 202 to generate a second hash 208a, and so on. In some implementations hash windows can, but need not, span line breaks, if lines contain fewer characters than the window size.

In the example shown in FIG. 2, the system hashes each line of the source code file 202 using only the characters from that line. For instance, the system may use a window that does not span line breaks to generate, as described in more detail below, a signature for each non-empty line in the source code file 202, e.g., for each line that includes characters other than a newline character.

In some implementations, the system may hash a predetermined number of characters for each line, beginning at the first character in the line, when the line contains fewer than the predetermined number of characters, e.g., as a rolling hash. For example, the system may determine the predetermined number of characters that are included in the line and subsequent lines until a total of the predetermined number of characters have been identified. When the predetermined number of characters is one-hundred and a particular source code file has several short lines of code throughout the file, e.g., when one of the shorter lines contains fifteen characters, the system uses the characters from the short line and additional characters from subsequent lines until identifying a total of one-hundred characters. The system may select the fifteen characters from the short line, seventy-two characters from the following adjacent line immediately after the short line, e.g., when that line has only seventy-two characters, and eleven characters from the next following line immediately after the adjacent line, assuming that the last line has at least eleven characters.

In some implementations, when the system cannot select the predetermined number of characters for a particular line, e.g., a line toward the end of the source code file that is shorter than the predetermined number of characters and there are not sufficient characters in subsequent lines to total the predetermined number of characters, the system may use a padding value to generate a hash for the particular line. For instance, the system may add null-characters after the characters in a last line of a source code file until the system has the predetermined number of characters to generate a padded string and use the padded string to generate a hash for the last line in the source code file.

In some implementations, the system may ignore whitespace characters, e.g., space characters, tab characters, or both, when creating a hash for each line in the source code file 202. For example, the system may remove whitespace characters from the source code file 202 before computing the hash for each line of the source code file 202.

In some implementations, the system may ignore comments. For instance, when the system is not looking for violations in comments, the system may ignore comments in a line when generating a hash for each line. In these implementations, when a particular line includes only comments, the system does not generate a hash for the particular line.

In some examples, the system may normalize newlines in the source code file 202. For instance, the system may treat "\r," "\n," "\n\n," and "\r\n" as "\n" when creating a hash of a line in the source code file 202.

When the system excludes irrelevant characters, e.g., ignores whitespace characters, normalizes newlines, ignores comments, or a combination of two or more of these, the system may make the hash stable for changes such as block indentation, replacing tabs with spaces, switching from line encoding for one environment to another, e.g., from Unix to Windows, or a combination of two or more of these. For example, the system would generate the same hash for a line that includes a leading tab character and a line that includes five leading space characters, when all other characters in the two lines are the same and in the same order.

At time $T_1$, the system generates a line-number-to-hash map 204 that includes the hashes of the lines in the source code file 202 and the line numbers to which the hash corresponds. For instance, the line-number-to-hash map 204 includes entries for lines one, three, four, six, seven, nine, ten, and twelve as those lines include characters that are not white space or only new lines. The line-number-to-hash map 204 does not include entries for lines two, five, eight, and eleven because those lines only include newline characters. In the example shown in FIG. 2, the system generates a hash using a predetermined number of characters from a line and does not include characters from subsequent lines.

In some implementations, a system may generate hashes for lines that include only newline characters, e.g., in case those lines include a violation or otherwise need to be referenced. The system may include appropriate hashes for any segments in the source code file 202. For instance, the system may include a hash for lines two, five, eight, and eleven in the line-number-to-hash map 204.

In some implementations, the system may generate the line-number-to-hash map 204 using a rolling hash algorithm, as described above. For instance, the system would hash "intd;while" when generating a hash for the first line in the source code file 202 with a window size of ten while excluding irrelevant characters. Similarly, the system would hash "while(a<c)" for the third line and "count++;}i" for the fourth line.

In some examples, a line-number-to-hash map may include collisions when two lines have the same hash. For instance, as shown in FIG. 2, the line-number-to-hash map 204 includes a second hash 208a-b for lines two and nine and a third hash 210a-c for lines four, seven, and ten.

At time $T_2$, the system generates unique signatures 212 for the source code file 202 by appending an identifier to each hash. For instance, the system determines, for a particular line, a number of identical hashes for lines preceding the line in the line-number-to-hash map 204. The system appends the number of identical hashes to the hash for the particular line and uses the appended hash as the unique hash for the line.

For example, when the system determines that a first instance of the third hash 210a "7a8b11" does not have any preceding lines in the line-number-to-hash map 204, the system appends "0" to the end of the first instance of the third hash 210a "7a8b11" to create a first unique hash 214 "7a8b110". When analyzing a second instance of the third hash 210b "7a8b11", the system determines that the first instance of the third hash 210a "7a8b11" occurred previously in the line-number-to-hash map 204 and appends "1" to the end of the third hash 210b "7a8b11" to create a second unique hash 216 "7a8b111".

The system may append a delimiter to a hash to separate the hash from the identifier, e.g., the number of identical hashes for lines preceding the line in the line-number-to-hash map 204. For instance, the system may use ":", "/", or another appropriate delimiter to separate the hash from the number when creating a unique hash. The system may create the first unique hash 214 as "7a8b11:0" and the second unique hash 216 as "7a8b11:1".

The system may generate the unique signatures 212 for the source code file 202 before, after, or during generation of a results file for the source code file 202. For instance, the system may obtain results files for one or more files in a snapshot, e.g., all files in the snapshot or a subset of files when some of the files do not have corresponding results files. For each file with a corresponding results file, the system generates the unique signatures 212. The system adds the unique signatures 212 to the results files for storage in a version control repository.

The system adds only the unique signatures 212 to a results file for the source code file 202 for the lines referenced in the results file. For example, if only lines one, four and seven are identified in the results file, the system adds the unique signatures for those lines, "3a34fc:0", "7a8b11:0", and "7a8b11:1" respectively, to the results file.

Given a unique line signature, e.g., a unique contextual identifier for a line, the system can compute the corresponding line by generating a line-number-to-hash map 204, as described above, and match the unique line signature against the line-number-to-hash map 204. For example, when the system receives the line signature "7a8b11:1" for the source code file 202, the system uses the line-number-to-hash map 204 to determine that the unique line signature is for line seven of the source code file 202.

The system may be able to generate the line-number-to-hash map 204 quickly, on the fly, or both. For instance, the system may generate the line-number-to-hash map 204 when needed, e.g., to create a results file, and not store the line-number-to-hash map 204 in a non-volatile memory. The system quickly generates the line-number-to-hash map 204 using the contents of the source code file 202, e.g., and might not need other data to generate the line-number-to-hash map 204.

In some implementations, the system may recreate a file that includes source code location identifiers using the line-number-to-hash map 204 and a file that includes unique signatures. For instance, when the system retrieves a static analysis file from a version control repository, the system may create the line-number-to-hash map 204, e.g., on the fly. The system maps the unique signatures from the static analysis file to line numbers in the source code file using the line-number-to-hash map 204. The system may use the line numbers to identify the locations referenced in the static analysis file, e.g., to present the static analysis file with the line number or other content for the static analysis file.

Figure 3:
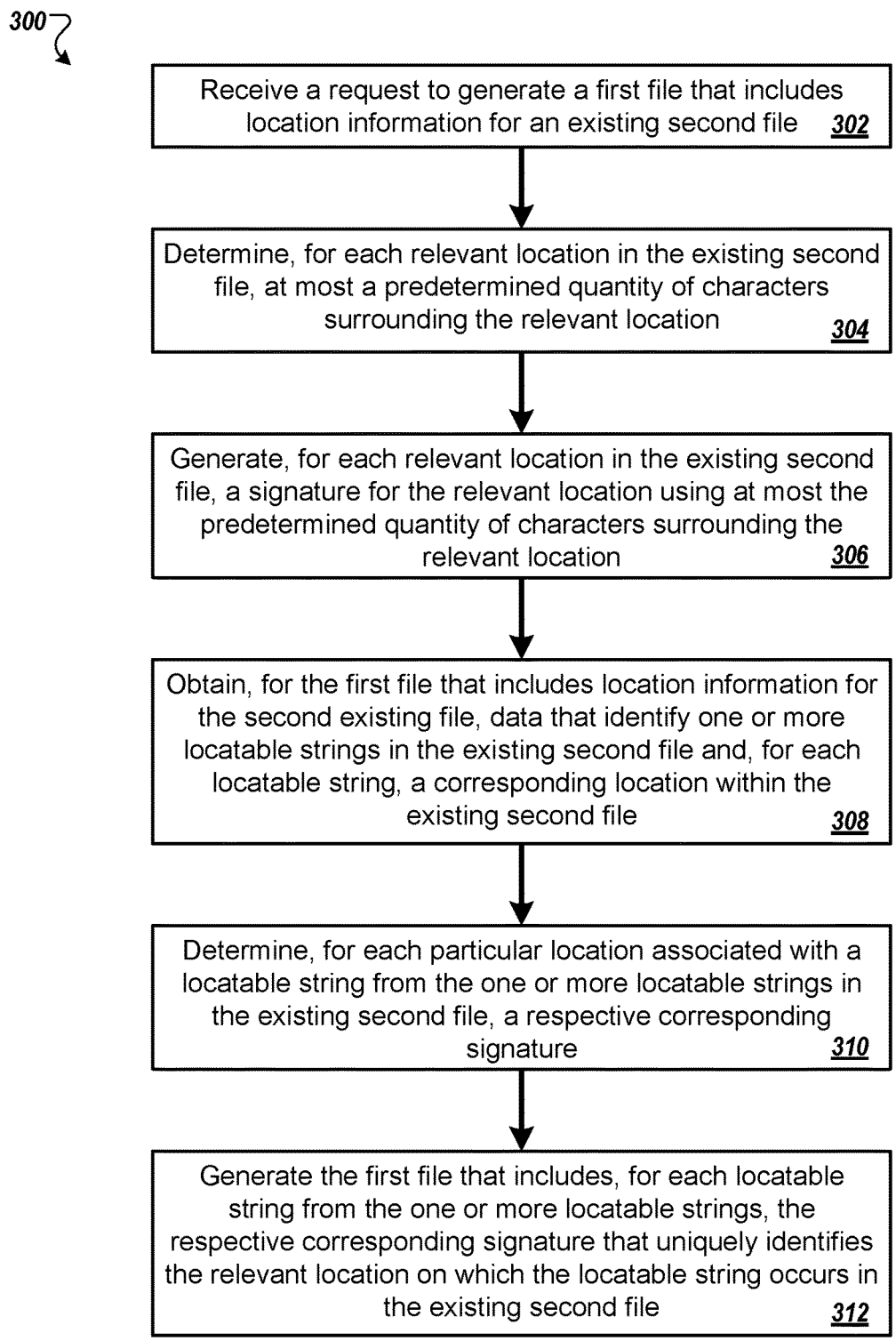
FIG. 3 is a flow diagram of a process for generating a results file with unique line signatures.

FIG. 3 is a flow diagram of a process 300 for generating a first file with unique location signatures. The process can be implemented by one or more computer programs installed on one or more computers. For example, the process 300 can be used by a file analysis system. One example of a file analysis system is the code analysis system 102 from the system 100.

A file analysis system receives a request to generate a first file that includes location information for an existing second file (302). For instance, the file analysis system may receive a request that indicates a snapshot should be created for a particular source code project. The file analysis system may determine to generate a static analysis results file, as the first file that includes location information. The file analysis system may generate static analysis results for the results file in response to receipt of the request that a snapshot should be created for the particular source code project. The file analysis system may receive a request to generate a first file that includes jump to location information for the source code file. In some examples, the file analysis system may receive a message from another system that indicates the request to generate the static analysis results.

The file analysis system determines, for each relevant location in the existing second file, at most a predetermined quantity of characters surrounding the relevant location (304). For example, the file analysis system determines the first one-hundred characters starting with the first character in each relevant location, e.g., as part of a rolling hash algorithm, excluding irrelevant characters, e.g., ignoring whitespace, after normalizing newline characters, ignoring comments, or a combination of two or more of these. A relevant location may be a line, a sentence, a paragraph, a page, a table, another appropriate location, or a combination of two or more of these. For instance, a file analysis system may determine the relevant locations as the lines and tables included in the second existing file.

In some examples, the file analysis system determines at most the first one-hundred characters in each relevant location, e.g., excluding irrelevant characters. In some implementations, the file analysis system determines all of the characters in a relevant location, e.g., excluding irrelevant characters. The file analysis system may determine any appropriate number of characters in or surrounding the location.

The file analysis system may use any appropriate locations in the existing second file. For instance, the file analysis system may use relevant locations represented by each one-hundred characters in the second existing file, e.g., a source code file, a location represented by the second character in each line, or a location identified by indentation of the source code, e.g., in which lines with additional indentation may be grouped together with a line with less indentation. In some examples, the relevant locations may each identify a particular function definition, a particular data structure definition, or another appropriate segment of source code in the source code file.

The file analysis system generates, for each relevant location in the existing second file, a signature for the relevant location using at most the predetermined quantity of characters surrounding the relevant location (306). The signature uniquely identifies the relevant location in the existing second file. The file analysis system may use any appropriate hash of the predetermined quantity of characters surrounding a relevant location to determine the signature for the relevant location. The file analysis system may select a hash method using a target length for the signature. In some examples, the file analysis system may determine the predetermined quantity of characters to which the hash should be applied using the target length for the signature and the hash method.

The file analysis system obtains, for the first file that includes location information for the existing second file, data that identify one or more locatable strings in the existing second file and, for each locatable string, a corresponding location within the existing second file (308). The locatable strings may be any segments of the existing second file, e.g., may include any appropriate characters or sequences of characters. For instance, the locatable strings may be a function definition, a segment of code that includes a violation, a segment of code that includes an unused variable, or a phrase for a book index. In some examples, a locatable string may include only a newline character. In some implementations, the file analysis system may obtain any appropriate type of data, such as static analysis results, that includes string to location mappings. For instance, a code analysis system may obtain data that includes software element to location mappings.

The file analysis system determines, for each particular location associated with a locatable string from the one or more locatable strings in the existing second file, a respective corresponding signature (310). For instance, the file analysis system uses a location-to-hash mapping, such as the line-number-to-hash mapping described above, to determine, for each location identified in the data, the respective corresponding signature.

The file analysis system generates the first file that includes, for each locatable string from the one or more locatable strings, the respective corresponding signature that uniquely identifies the relevant location on which the locatable string occurs in the existing second file (312). The file analysis system may provide the first file to a version control repository, e.g., a content-addressable storage, for storage in a data store.

In some implementations, the file analysis system may use the process 300 to generate any appropriate type of file with unique location signatures. For instance, the file analysis system may generate static analysis results, dynamic analysis results, a document that references a portion of another document, a particular document that includes references to other portions of the particular document, e.g., that references itself, or a combination of two or more of these, with unique location signatures using the process 300.

The order of steps in the process 300 described above is illustrative only, and generating the first file with the unique location signatures can be performed in different orders. For example, the file analysis system may obtain data and then determine the predetermined quantity of characters surrounding each of the locations and the signature for the location.

In some implementations, the process 300 can include additional steps, fewer steps, or some of the steps can be divided into multiple steps. For example, the file analysis system may receive a location-to-hash mapping and determine the respective corresponding signature using the location-to-hash mapping without performing steps 304 and 306.

In some implementations, a file analysis system may generate a hash for a relevant location in an existing file and append an offset, which identifies a particular portion of the relevant location at which a locatable string occurs, to the end of the hash. For example, the file analysis system may determine a hash for a particular paragraph in a document as a relevant location. The file analysis system determines that a specific portion of the particular paragraph is referenced in another document or another portion of the same document, e.g., the specific portion is the second second of the document. The file analysis system determines an offset for the particular portion. The offset may identify the number of characters from the beginning of the relevant location at which the locatable string occurs, the number of sentences before the locatable string in the relevant location, or another appropriate offset. The file analysis system uses the hash and the offset to generate a signature for the locatable string. The file analysis system may use the signature as a reference to later determine the location, e.g., the precise location, of the locatable string within the relevant location.

For instance, when a results file generator creates results files, the results file generator may determine locatable strings of source code for which violations occur. The results file generator may determine both row, e.g., line, and column offsets for the locatable string that identify a particular location within a source code file at which the locatable string occurs. When creating a results file, the results file generator determines a line signature for the line and places both the line signature and the column offset in the results file. For example, the results file generator places the line signature "7a8b11:0," for line four of the source code file, and column identifier "six" in a results file to identify a particular locatable string of source code in the source code file. The results file generator may append the column identifier to the end of the line signature, e.g., "7a8b11:0:6".

In some examples, the results file generator may determine absolute offsets from a beginning of a file for locatable strings. For instance, the results file determines that a locatable string beginning at the twenty-second character in a source code file has a violation. The results file generator, or another component of a file analysis system, may use a rolling hash algorithm to determine a hash for each character in the source code file and, using the hashes, corresponding signatures for each character. The results file generator determines the signature for the twenty-second character and includes the signature in a results file that indicates the violation for the locatable string beginning at the twenty-second character in the source code file.

When a file analysis system uses the results file to determine the locatable string of source code for which the violation occurs, the file analysis system generates a signature for each character in the source code file, e.g., using the same process performed during creation of the results file. The file analysis system uses the signatures to determine the locatable string of source code for which the violation occurs. The file analysis system may present information about the locatable string, e.g., the actual source code from the source code file. The file analysis system may present information about the violation with the information about the locatable string.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Embodiment 1 is a method comprising: receiving a request to generate a first file that includes location information for an existing second file; generating, for each relevant location in the existing second file, a signature for the relevant location using at most a predetermined quantity of characters surrounding the relevant location in response to receiving the request to generate the first file that includes location information for the existing second file, wherein the signature uniquely identifies the relevant location in the existing second file; obtaining, for the first file that includes location information for the existing second file, data that identify one or more locatable strings in the existing second file and, for each locatable string, a corresponding location within the existing second file; determining, for each particular location associated with a locatable string from the one or more locatable strings in the existing second file, a respective corresponding signature; and generating the first file that includes, for each locatable string from the one or more locatable strings, the respective corresponding signature that uniquely identifies the relevant location on which the locatable string occurs in the existing second file.

Embodiment 2 is a method comprising: accessing a first file that includes signatures for locatable strings of a second file, wherein each of the signatures uniquely identifies a location in the second file on which the locatable string occurs; accessing the second file; generating, for each location in the second file, a mapping of the location to a signature for the location using at most a predetermined quantity of characters surrounding the location in response to accessing the first file that includes signatures for locatable strings of the second file, wherein the signature uniquely identifies the location in the second file; and determining, for each of the signatures in the first file, the corresponding location in the second file using the mapping.

Embodiment 3 is a method of embodiment 1 comprising: accessing a first file that includes signatures for locatable strings of a second file, wherein each of the signatures uniquely identifies a location in the second file on which the locatable string occurs; accessing the second file; generating, for each location in the second file, a mapping of the location to a signature for the location using at most a predetermined quantity of characters surrounding the location in response to accessing the first file that includes signatures for locatable strings of the second file, wherein the signature uniquely identifies the location in the second file; and determining, for each of the signatures in the first file, the corresponding location in the second file using the mapping.

Embodiment 4 is a method of any one of embodiments 1 through 3, wherein generating, for each relevant location in the existing second file, the signature for the relevant location using at most the predetermined quantity of characters surrounding the relevant location comprises generating, for each line in the existing second file, a signature for the line using at most the predetermined quantity of characters surrounding the line.

Embodiment 5 is a method of any one of embodiments 1 through 4, comprising: determining, for each relevant location in the existing second file, the predetermined quantity of characters surrounding the relevant location in response to receiving the request to generate the first file that includes location information for the existing second file, wherein generating, for each relevant location in the existing second file, the signature for the relevant location using at most the predetermined quantity of characters surrounding the relevant location is responsive to determining, for each relevant location in the existing second file, the predetermined quantity of characters surrounding the relevant location.

Embodiment 6 is the method of any one of embodiments 1 through 5, wherein generating, for each relevant location in the existing second file, the signature for the relevant location using at most the predetermined quantity of characters surrounding the relevant location comprises generating, for each relevant location in the existing second file, the signature for the relevant location that uniquely identifies the relevant location in the existing second file by applying a hash to at most the predetermined quantity of characters surrounding the relevant location.

Embodiment 7 is the method of any one of embodiments 1 through 6, wherein generating, for each relevant location in the existing second file, the signature for the relevant location using at most the predetermined quantity of characters surrounding the relevant location comprises: appending, for each relevant location in the existing second file, a delimiter to the hash of at most the predetermined quantity of characters surrounding the relevant location; and appending, for each location in the existing second file, a count value to the delimiter that identifies a quantity of times the signature has been identified in the existing second file prior to generation of the corresponding signature.

Embodiment 8 is the method of any one of embodiments 1 through 7, wherein generating, for each relevant location in the existing second file, the signature for the relevant location using at most the predetermined quantity of characters surrounding the relevant location comprises: normalizing newline characters in the existing second file to generate a normalized existing second file; and determining, for each relevant location in the normalized existing second file, at most the predetermined quantity of characters surrounding the relevant location excluding irrelevant characters.

Embodiment 9 is the method of any one of embodiments 1 through 8, wherein determining, for each relevant location in the normalized existing second file, at most the predetermined quantity of characters surrounding the relevant location excluding irrelevant characters comprises determining, for each relevant location in the normalized existing second file, at most the predetermined quantity of characters surrounding the relevant location excluding space characters and tab characters.

Embodiment 10 is the method of any one of embodiments 1 through 9, wherein generating, for each relevant location in the existing second file, the signature for the relevant location using at most the predetermined quantity of characters surrounding the relevant location comprises generating, for each relevant location in the existing second file, the signature using a rolling hash with a fixed size window.

Embodiment 11 is the method of any one of embodiments 1 through 10, wherein generating, for each relevant location in the existing second file, the signature for the relevant location using at most the predetermined quantity of characters surrounding the relevant location comprises: selecting, for each relevant location in the existing second file, at most the predetermined quantity of characters from the relevant location starting with a first character in the relevant location without selecting characters from another location; and using, for each relevant location in the existing second file, the selected characters to generate the signature for the relevant location.

Embodiment 12 is the method of any one of embodiments 1 through 11, wherein obtaining, for the first file that includes location information for the existing second file, the data comprises obtaining, for the first file that includes location information for an existing source code file, data that identify one or more locatable strings of source code in the existing source code file and, for each locatable string of source code, a corresponding location within the existing source code file.

Embodiment 13 is the method of any one of embodiments 1 through 12, wherein obtaining, for the first file that includes location information for the existing second file, the data comprises obtaining, for the first file that includes location information for an existing source code file, static analysis results that identify one or more locatable strings of source code in the existing source code file and, for each locatable string of source code, a corresponding location within the existing source code file.

Embodiment 14 is the method of any one of embodiments 1 through 13, comprising: replacing, for each of the signatures in the first file, the signature with the corresponding location in the second file to generate a modified file; and causing presentation on a display of the modified file with the corresponding locations in the second file.

Embodiment 15 is the method of any one of embodiments 1 through 14, wherein accessing the first file that includes signatures for locatable strings of the second file comprises receiving, from a version control system, the first file that includes signatures for locatable strings of the second file.

Embodiment 16 is the method of any one of embodiments 1 through 15, wherein receiving, from the version control system, the first file that includes signatures for locatable strings of the second file comprises receiving, from a version control system that includes the first file in a content-addressable storage, the first file that includes signatures for locatable strings of the second file.

Embodiment 17 is a system comprising: one or more computers and one or more storage devices storing instructions that are operable, when executed by the one or more computers, to cause the one or more computers to perform operations of any of embodiments 1 through 16.

Embodiment 18 is a computer storage medium encoded with a computer program, the program comprising instructions that are operable, when executed by data processing apparatus, to cause the data processing apparatus to perform operations of any of embodiments 1 through 16.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   generating, by one or more computers, for each relevant location in a source code file, a unique signature for the relevant location in the source code file using a window of characters for the relevant location in the source code file, wherein the generated unique signature uniquely identifies the relevant location in the source code file;
   obtaining, by at least one of the one or more computers, static analysis results for the source code file, wherein the static analysis results identify one or more respective properties for one or more strings in the source code file and, for each string from the one or more strings in the source code file, a location of the string within the source code file;
   determining, by at least one of the one or more computers, for each location of a string from the one or more strings in the source code file, a corresponding one of the generated unique signatures for the relevant location in the source code file that uniquely identifies a proper subset of the source code file that includes the location of the string from the one or more strings in the source code file;

generating, by at least one of the one or more computers, a static analysis results file that includes, for each string from the one or more strings in the source code file, the corresponding one of the generated unique signatures for the relevant location in the source code file that uniquely identifies the proper subset of the source code file that includes the location of the string from the one or more strings in the source code file; and sending, by at least one of the one or more computers, for storage, the static analysis results file to a content-addressable storage system.

2. The computer-implemented method of claim 1, wherein sending, for storage, the static analysis results file to the content-addressable storage system comprises sending, for storage, the static analysis results file to the content-addressable storage system to cause the content-addressable storage system to:

determine whether the static analysis results file is already stored in the content-addressable storage system; and determine to skip storage of the static analysis results file in a memory upon determining that the static analysis results file is already stored in the content-addressable storage system.

3. The computer-implemented method of claim 1, wherein each relevant location in the source code file represents a proper subset of the source code file that is a different line or a different character of the source code file.

4. The computer-implemented method of claim 1, wherein, for at least one of the relevant locations in the source code file, the window of characters for the relevant location in the source code file starts with a first character at the relevant location in the source code file.

5. The computer-implemented method of claim 1, wherein, for at least one of the relevant locations in the source code file, the window of characters for the relevant location in the source code file ends with a last character in a subset of the source code file associated with the relevant location in the source code file.

6. The computer-implemented method of claim 5, wherein, for at least one of the relevant locations in the source code file, the relevant location in the source code file identifies a line in the source code file, and the window of characters for the relevant location in the source code file ends with a last character in the line in the source code file identified by the relevant location in the source code file.

7. The computer-implemented method of claim 1, wherein the respective window of characters for each relevant location in the source code file comprises characters in a subset of the source code file associated with the relevant location in the source code file.

8. The computer-implemented method of claim 7, wherein each relevant location in the source code file identifies a line in the source code file, and wherein each window for each relevant location in the source code file comprises characters in the line in the source code file identified by the relevant location in the source code file.

9. The computer-implemented method of claim 1, wherein each window for each relevant location in the source code file has a same number of characters for the relevant location in the source code file.

10. The computer-implemented method of claim 1, wherein generating, for each relevant location in the source code file, the unique signature for the relevant location in the source code file using the window of characters for the relevant location in the source code file comprises:

selecting, for each relevant location in the source code file, a window of characters from a group comprising: one or more characters in the source code file before the relevant location in the source code file, one or more characters in the source code file at the relevant location in the source code file, one or more characters in the source code file after the relevant location in the source code file, or a plurality of characters surrounding and including the relevant location in the source code file; and using the selected window of characters to generate the unique signature for the relevant location in the source code file.

11. The computer-implemented method of claim 1, wherein generating, for each relevant location in the source code file, the unique signature for the relevant location in the source code file using the window of characters for the relevant location in the source code file comprises:

hashing, for each relevant location in the source code file, characters in the window of characters to generate a corresponding hash value; and generating, for each relevant location in the source code file, the unique signature for the relevant location in the source code file using the corresponding hash value.

12. The computer-implemented method of claim 11, wherein generating, for each relevant location in the source code file, the unique signature for the relevant location in the source code file using the corresponding hash value comprises generating, for each relevant location in the source code file, the unique signature for the relevant location in the source code file that comprises a proper subset of the corresponding hash value.

13. The computer-implemented method of claim 11, wherein generating, for each relevant location in the source code file, the unique signature for the relevant location in the source code file using the corresponding hash value comprises appending a count value that represents a number of times that the corresponding hash value has been generated from locations in the source code file to at least a portion of the corresponding hash value.

14. A system comprising:

one or more computers and one or more storage devices storing instructions that are operable, when executed by the one or more computers, to cause the one or more computers to perform operations comprising:

generating, for each relevant location in a source code file, a unique signature for the relevant location in the source code file using a window of characters for the relevant location in the source code file, wherein the generated unique signature uniquely identifies the relevant location in the source code file;

obtaining static analysis results for the source code file, wherein the static analysis results identify one or more respective properties for one or more strings in the source code file and, for each string from the one or more strings in the source code file, a location of the string within the source code file;

determining, for each location of a string from the one or more strings in the source code file, a corresponding one of the generated unique signatures for the relevant location in the source code file that uniquely identifies a proper subset of the source code file that includes the location of the string from the one or more strings in the source code file;

generating a static analysis results file that includes, for each string from the one or more strings in the source code file, the corresponding one of the generated unique signatures for the relevant location in the source code file that uniquely identifies the proper subset of the source code file that includes the location of the string from the one or more strings in the source code file; and sending, for storage, the static analysis results file to a content-addressable storage system.

15. The system of claim 14, wherein sending, for storage, the static analysis results file to the content-addressable storage system comprises sending, for storage, the static analysis results file to the content-addressable storage system to cause the content-addressable storage system to:

determine whether the static analysis results file is already stored in the content-addressable storage system; and determine to skip storage of the static analysis results file in a memory upon determining that the static analysis results file is already stored in the content-addressable storage system.

16. The system of claim 14, wherein each relevant location in the source code file represents a proper subset of the source code file that is a different line or a different character of the source code file.

17. The system of claim 14, wherein, for at least one of the relevant locations in the source code file, the window of characters for the relevant location in the source code file starts with a first character at the relevant location in the source code file.

18. The system of claim 14, wherein, for at least one of the relevant locations in the source code file, the window of characters for the relevant location in the source code file ends with a last character in a subset of the source code file associated with the relevant location in the source code file.

19. The system of claim 18, wherein, for at least one of the relevant locations in the source code file, the relevant location in the source code file identifies a line in the source code file, and the window of characters for the relevant location in the source code file ends with a last character in the line in the source code file identified by the relevant location in the source code file.

20. The system of claim 14, wherein the respective window of characters for each relevant location in the source code file comprises characters in a subset of the source code file associated with the relevant location in the source code file.

21. The system of claim 20, wherein each relevant location in the source code file identifies a line in the source code file, and wherein each window for each relevant location in the source code file comprises characters in the line in the source code file identified by the relevant location in the source code file.

22. The system of claim 14, wherein each window for each relevant location in the source code file has a same number of characters for the relevant location in the source code file.

23. The system of claim 14, wherein generating, for each relevant location in the source code file, the unique signature for the relevant location in the source code file using the window of characters for the relevant location in the source code file comprises:

selecting, for each relevant location in the source code file, a window of characters from a group comprising: one or more characters in the source code file before the relevant location in the source code file, one or more characters in the source code file at the relevant location in the source code file, one or more characters in the source code file after the relevant location in the source code file, or a plurality of characters surrounding and including the relevant location in the source code file; and using the selected window of characters to generate the unique signature for the relevant location in the source code file.

24. The system of claim 14, wherein generating, for each relevant location in the source code file, the unique signature for the relevant location in the source code file using the window of characters for the relevant location in the source code file comprises:

hashing, for each relevant location in the source code file, characters in the window of characters to generate a corresponding hash value; and generating, for each relevant location in the source code file, the unique signature for the relevant location in the source code file using the corresponding hash value.

25. The system of claim 24, wherein generating, for each relevant location in the source code file, the unique signature for the relevant location in the source code file using the corresponding hash value comprises generating, for each relevant location in the source code file, the unique signature for the relevant location in the source code file that comprises a proper subset of the corresponding hash value.

26. The system of claim 24, wherein generating, for each relevant location in the source code file, the unique signature for the relevant location in the source code file using the corresponding hash value comprises appending a count value that represents a number of times that the corresponding hash value has been generated from locations in the source code file to at least a portion of the corresponding hash value.

27. A computer program product, encoded on one or more non-transitory computer storage media, comprising instructions that when executed by one or more computers cause the one or more computers to perform operations comprising:

generating, for each relevant location in a source code file, a unique signature for the relevant location in the source code file using a window of characters for the relevant location in the source code file, wherein the generated unique signature uniquely identifies the relevant location in the source code file;

obtaining static analysis results for the source code file, wherein the static analysis results identify one or more respective properties for one or more strings in the source code file and, for each string from the one or more strings in the source code file, a location of the string within the source code file;

determining, for each location of a string from the one or more strings in the source code file, a corresponding one of the generated unique signatures for the relevant location in the source code file that uniquely identifies a proper subset of the source code file that includes the location of the string from the one or more strings in the source code file;

generating a static analysis results file that includes, for each string from the one or more strings in the source code file, the corresponding one of the generated unique signatures for the relevant location in the source code file that uniquely identifies the proper subset of the source code file that includes the location of the string from the one or more strings in the source code file; and sending, for storage, the static analysis results file to a content-addressable storage system.

28. The computer program product of claim 27, wherein sending, for storage, the static analysis results file to the content-addressable storage system comprises sending, for storage, the static analysis results file to the content-addressable storage system to cause the content-addressable storage system to:

determine whether the static analysis results file is already stored in the content-addressable storage system; and determine to skip storage of the static analysis results file in a memory upon determining that the static analysis results file is already stored in the content-addressable storage system.

29. The computer program product of claim 27, wherein each relevant location in the source code file represents a proper subset of the source code file that is a different line or a different character of the source code file.

30. The computer program product of claim 27, wherein, for at least one of the relevant locations in the source code file, the window of characters for the relevant location in the source code file starts with a first character at the relevant location in the source code file.

* * * * *